Sept. 26, 1967          J. W. REESOR          3,343,252

CONDUIT SYSTEM AND METHOD FOR MAKING THE SAME OR THE LIKE

Filed March 3, 1964          6 Sheets-Sheet 1

INVENTOR.
JAMES W. REESOR

BY *Glenn, Palmer &*
*Matthews*

HIS ATTORNEYS

Sept. 26, 1967 J. W. REESOR 3,343,252
CONDUIT SYSTEM AND METHOD FOR MAKING THE SAME OR THE LIKE
Filed March 3, 1964 6 Sheets-Sheet 2

INVENTOR.
JAMES W. REESOR
BY Glenn, Palmer &
Matthews
HIS ATTORNEYS

Sept. 26, 1967 J. W. REESOR 3,343,252
CONDUIT SYSTEM AND METHOD FOR MAKING THE SAME OR THE LIKE
Filed March 3, 1964 6 Sheets-Sheet 3

INVENTOR.
JAMES W. REESOR
BY
HIS ATTORNEYS

Sept. 26, 1967  J. W. REESOR  3,343,252
CONDUIT SYSTEM AND METHOD FOR MAKING THE SAME OR THE LIKE
Filed March 3, 1964  6 Sheets-Sheet 6

INVENTOR.
JAMES W. REESOR
BY
HIS ATTORNEYS 3,343,252
**CONDUIT SYSTEM AND METHOD FOR
MAKING THE SAME OR THE LIKE**
James W. Reesor, Richmond, Va., assignor to Reynolds Metals Company, Richmond, Va., a corporation of Delaware
Filed Mar. 3, 1964, Ser. No. 348,930
4 Claims. (Cl. 29—458)

This invention relates to an improved conduit system or the like as well as to an improved method and apparatus for making such a conduit system or the like.

It is well known that it is desirous to effectively couple together adjacent ends of pipes or conduits by a coupling means in a simple and effective manner whereby the coupled joint structure can withstand the internal pressures in the pipe line system without failure or leakage thereof.

Further, it is desirable to utilize an adhesive to not only secure the adjacent ends of the adjacent conduits together, but also to provide the means for sealing closed the joint therebetween.

However, it has been found that normal adhesives have increased failure when placed under tension by the internal fluid pressure of the conduit system so that the adhesives have not, heretofore, been effective to provide coupling means for adjacent conduits wherein the fluid pressure within the conduits is relatively high.

According to the teachings of this invention, however, an improved conduit system is provided wherein adhesive means can be effectively utilized to secure the adjacent ends of adjacent conduits together in such a manner that tension loading of the adhesive means is avoided whereby the tendency of the adhesive means to peel under tension is avoided and the adhesive means maintains its strength.

Accordingly, it is an object of this invention to provide an improved conduit system having one or more of the novel features set forth above or hereinafter shown or described.

Another object of this invention is to provide an improved method for making such a conduit system or the like.

A further object of this invention is to provide an improved apparatus for making such a conduit system or the like.

Other objects, uses and advantages of this invention are apparent from a reading of this description which proceeds with reference to the accompanying drawings forming a part thereof and wherein.

Figure 1:
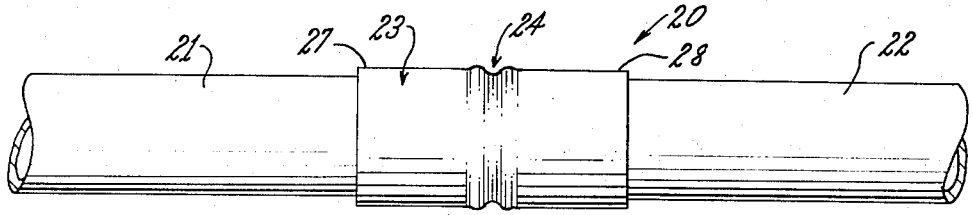
FIGURE 1 is a fragmentary side view of an improved conduit system of this invention.

While the various features of this invention are hereinafter described and illustrated as being particularly adaptable for forming a conduit coupling means for a fluid system or the like, it is to be understood that the various features of this invention can be utilized either singly or in any combination thereof to provide other structures as desired.

Therefore, this invention is not to be limited to only the embodiment illustrated in the drawings, because the drawings are merely utilized to illustrate one of the wide variety of uses of this invention.

Referring now to FIGURE 1, an improved conduit system of this invention is generally indicated by the reference numeral 20 and comprises a pair of metallic conduits or pipes 21 and 22 fluidly coupled together by a coupling sleeve 23 of this invention in a manner hereinafter described.

Figure 2:
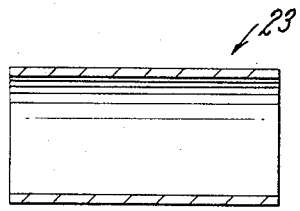
FIGURE 2 is a cross-sectional view of the coupling sleeve of this invention.

The coupling sleeve 23 of this invention comprises a length of pipe or conduit substantially uniform throughout its length as illustrated in FIGURE 2. However, the sleeve 23 subsequently has an annular groove 24, FIGURE 3, formed medially therein in a manner hereinafter described to define an inwardly directed annular bead 25 for a purpose hereinafter described. Also, either before the bead 25 has been formed or thereafter, the internal peripheral surface 26 of the coupling sleeve 23 is scored at the opposed ends 27 and 28 thereof in the manner illustrated in FIGURE 4.

In particular, the scoring in the internal peripheral surface 26 of the coupling sleeve 23 can comprise knurling as desired, the function of the scoring being to trap adhesive throughout the length of the coupling sleeve 23 and/or to provide a spacing between the pipes and coupling sleeve to secure an optimum thickness of adhesive for a purpose hereinafter described.

Figure 4:
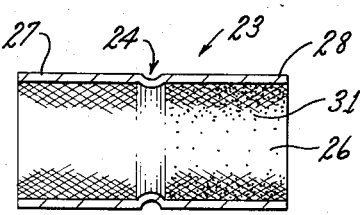
FIGURE 4 is a view similar to FIGURE 2 and illustrates the coupling sleeve after the internal peripheral surface thereof has been knurled according to the teachings of this invention.
Figure 5:
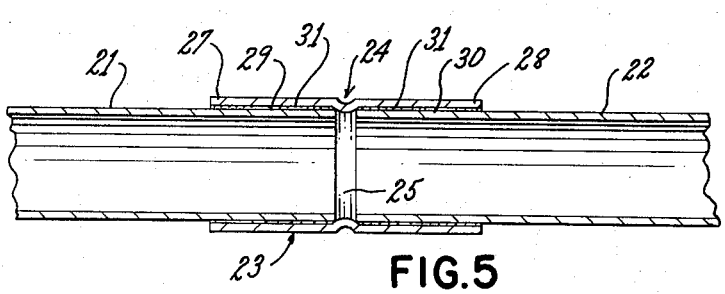
FIGURE 5 is an axial cross-sectional view illustrating one of the initial steps in forming a coupling structure of this invention.

After the coupling sleeve has been formed in the manner illustrated in FIGURE 4, the same is adapted to have the adjacent ends 29 and 30 of the conduits 21 and 22 telescopically received therein in the manner illustrated in FIGURE 5 without any press-fitting relationship therewith until the ends 29 and 30 abut the spacing bead 25. Thus, for feasible field assembly of the joint wherein some means must be provided for centering the conduits 21 and 22 in the coupler 23, the bead 25 of the coupler provides a stop for the conduits ends which assures that both ends project into the coupler 23 an equal distance.

Before the ends 29 and 30 of the conduits 21 and 22 are inserted in the coupling sleeve 23 in the manner illustrated in FIGURE 5, the external peripheral surfaces of the ends 29 and 30 of the conduits 21 and 22 are effectively cleaned by chemicals or by sandblasting to render the same readily receptive to adhesive means.

Also, a suitable adhesive is applied to the internal peripheral surface 26 of the coupling sleeve 23 and is generally indicated by the reference numeral 31 in FIGURE 5. In order to effect an even distribution of the adhesive and to avoid an excess of adhesive at the center of the coupling sleeve 23 when it is assembled to the pipe, a measured amount of adhesive, depending upon the diameter and length of the coupling sleeve 23, is applied interiorly to the ends of the coupling sleeve 23.

For example, the adhesive 31 can comprise a high strength, two-part modified epoxy resin normally sold under the trademark, Shell 907, and manufactured by the Shell Chemical Company, New York, N.Y.

Figure 6:
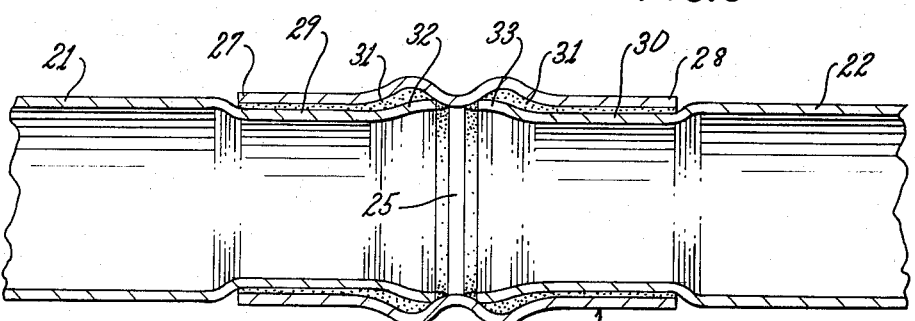
FIGURE 6 is an enlarged, fragmentary exagerated cross-sectional view illustrating the completed coupling structure of this invention.

After the parts have been assembled in the manner illustrated in FIGURE 5, the opposed ends 27 and 28 of the coupling sleeve 23 are radially inwardly shrunk by what is known as a draw sizing operation onto the ends 29 and 30 of the conduits 21 and 22 in the manner illustrated in FIGURE 6 to complete the coupling structure of this invention.

In particular, it can be seen in FIGURE 6 that the outside diameter of the ends 27 and 28 of the coupling sleeves 23 are reduced from the outer portions thereof toward the medial portion thereof in such a manner to not only place the adhesive 31 under compression but to also place the ends 29 and 30 of the conduits 21 and 22 under compression so that the ends 29 and 30 are continuously tending to move radially outwardly and, thus, avoid tension loading of the adhesive 31.

This is a particularly important feature of this invention because it is well known that a high strength adhesive of the above type has its greatest strength when not under tension and has its lowest strength when placed under tension.

Further, it can be seen in FIGURE 6 that when the ends 27 and 28 of the coupling sleeve 23 are shrunk onto the ends 29 and 30 of the conduits 21 and 22 in a manner hereinafter described, the same cause the outer end portions 32 and 33 of the conduits 21 and 22 to flare radially outwardly a distance substantially greater than the resulting internal diameter of the ends 27 and 28 of the coupling sleeve 23 as illustrated in FIGURE 6.

This flared arrangement of the end portions 32 and 33 of the conduits 21 and 22 together with the shrunk portions of the coupling sleeve 23 causes the adhesive 31 to be substantially wedge-shaped with the thick portion thereof adjacent the annular bead 25 and the narrow portion thereof tapering out toward the extreme ends of the coupling sleeve 23.

Thus, it can be seen that as the internal pressure in the conduit system 20 tends to untelescope the conduits 21 and 22 from the coupling sleeve 23, the flared portions 32 and 33 of the conduits 21 and 22 place the wedge-shaped adhesive 31 under compression to prevent shear thereof while at the same time mechanically interlocking with the coupling sleeve 23 to increase the strength thereof. Also, as the adhesive 31 tends to shear by the attempt to pull the conduits 21 and 22 out of the coupling sleeve 23, the adhesive itself is placed under further compression by the wedge shape thereof.

Further, the outward flaring of the ends 29 and 30 of the conduits 21 and 22 up into the bulges of the coupler 23 together with the shrinking of the coupler 23 onto the conduits 21 and 22 provides a mechanical lock which allows the joint to be handled while the adhesive is still wet without adversely affecting the joint. This is essential because there must be handling of the other end of one of the conduits 21 or 22 through lifting thereof during such operations as wrapping the conduits and placing the same in a ditch or the like, such operations being performed while the adhesive of the joint is still wet.

This mechanical lock of the coupler 23 with the conduits 21 and 22 has sufficient strength to withstand the end thrust generated by pressure in the conduits 21 and 22 so that same cannot untelescope from the coupler 23 even if there was no adhesive in the joint whereby the mechanical lock prevents a catastrophic failure of the joint in case of adhesive failure.

Therefore, it can be seen that improved coupling construction is provided by this invention wherein an adhesive means 31 can be utilized to effectively secure and seal together adjacent ends 29 and 30 of adjacent conduits 21 and 22.

While the coupling sleeve 23 can be formed of any suitable material in any suitable manner, the same is formed from metallic material which will have the same strength in hoop tension as the conduits 21 and 22 so that the internal pressure of the conduit system 20 will not break the coupling sleeve 23 before it breaks the conduits 21 and 22.

For example, the desired thickness of the coupling, sleeve 23 can be computed by the modified Barlow formula wherein $p$ equals $2ts$ over $OD$ minus $.8t$. P is the operating pressure, $t$ is the wall thickness, and $s$ is the design hoop stress and OD is the outside diameter of the pipe or coupling sleeve.

Further, while the conduits 21 and 22 and coupling sleeve 23 can be formed of any suitable metallic material, one embodiment thereof has been provided wherein the conduits 21 and 22 were aluminum alloy 6061–T6 and the coupling sleeve 23 was 6061–T4 with an increased thickness to compensate for the lower T4 strength in the joint area.

The method and apparatus for making the conduit system 20 in the configuration previously described will now be described.

Figure 7:
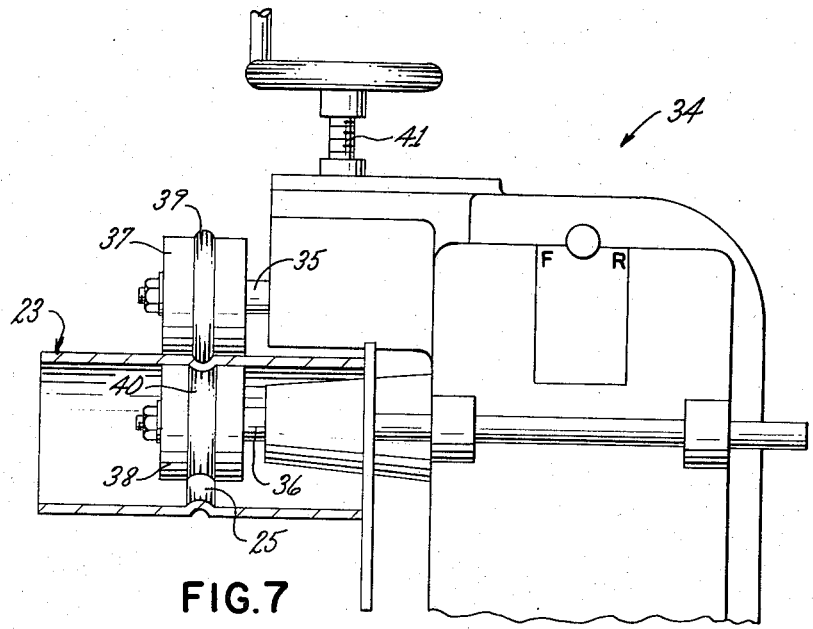
FIGURE 7 is a fragmentary side view illustrating the apparatus of this invention for providing the annular bead illustrated in FIGURE 3.
Figure 8:
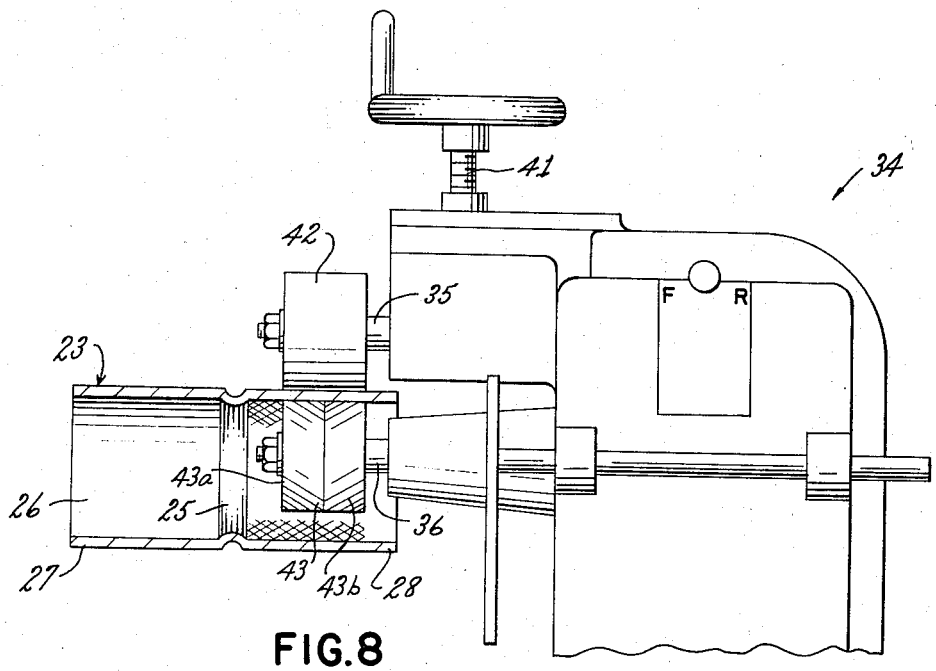
FIGURE 8 is a view similar to FIGURE 7 and illustrates the apparatus of this invention for forming the knurled surface as illustrated in FIGURE 4.

As illustrated in FIGURES 7 and 8, a single apparatus 34 can be serially utilized to form the annular bead 25 on the coupling sleeve 23 as well as the knurling illustrated in FIGURE 4.

In particular, FIGURE 7 illustrates the apparatus 34 forming the annular bead 25 in the sleeve 23 while the apparatus 34 in FIGURE 8 is performing the knurling on the internal peripheral surface 26 of the coupling sleeve 23.

As illustrated in FIGURES 7 and 8, the apparatus 34 includes a pair of horizontally disposed and vertically aligned shafts 35 and 36 each being power driven or with only the shaft 36 being power driven if desired.

As illustrated in FIGURE 7, a pair of rollers 37 and 38 are respectively mounted on the shafts 35 and 36 to rotate in unison therewith, the roller 37 having an outwardly directed annular bead 39 while the roller 38 has an annular recess 40 complementary to the annular bead 39 of the roller 37.

With the roller 37 spaced from the roller 38 by a suitable hand wheel adjusting mechanism 41, the coupling sleeve 23 is inserted between the rollers 37 and 38. Thereafter, the roller 37 is moved toward the roller 38 by the hand wheel 41 until the annular bead 39 thereof conforms the medial portion of the coupling sleeve 23 into the recess 40 of the roller 38 in the manner illustrated in FIGURE 7.

Figure 3:
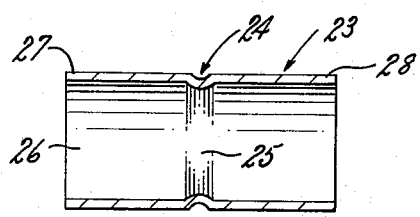
FIGURE 3 is a view similar to FIGURE 2 and illustrates the coupling sleeve after an annular bead has been formed therein.

Thereafter, one or both of the shafts 35 and 36 are rotated to cause the coupling sleeve 23 to rotate in unison therewith whereby the annular bead 25 is rolled into the coupling sleeve 23 to form the structure illustrated in FIGURE 3.

Thereafter, the coupling sleeve 23 is removed from the apparatus 34 in FIGURE 7 and the rollers 37 and 38 thereof are replaced by rollers 42 and 43 in the manner illustrated in FIGURE 8, the roller 42 having a smooth outer peripheral surface while the roller 43 has a knurl producing external peripheral surface defined by one half 43a thereof having knurls in one direction and the other half 43b having the knurls in another direction.

Thus, one end 27 or 28 of the coupling sleeve 26 can be placed between the rollers 42 and 43 of the apparatus 34 in the manner illustrated in FIGURE 8 with the sleeve 26 canted relative to the axes of the rollers 42 and 43. The roller 42 can be pressed downwardly toward the roller 43 to cause the roller 43 to indent into the internal peripheral surface 26 of the coupling sleeve 23 so that upon rotation of one or both shafts 36 and 35, the knurl scoring can be rolled into the internal peripheral surface 26 of the coupling sleeve 23 from the center thereof toward the outer end, one half 34b of the roller 43 making a knurl in the coupler ID at an angle and, with the travel speed so arranged, the other half 43a of the roller 43 overlaps the cuts made by the first half 43b to produce the knurling pattern illustrated in the drawings.

Therefore, it can be seen that by protruding the above knurling operation on both opposed ends 27 and 28 of the coupling sleeve 23 in the manner illustrated in FIGURE 8, the completed coupling construction can be formed in the manner illustrated in FIGURE 4.

After the coupling sleeve 23 has been formed in the manner illustrated in FIGURE 4 by the apparatus 34 previously described, the adhesive means 31 can be spread on the internal peripheral surface 26 thereof so that the same will be trapped in the scores produced therein by the knurling roll 43.

Thereafter, the coupling sleeve 23 and conduits 21 and 22 are assembled together in the manner illustrated in FIGURE 5 to be interconnected together by the apparatus 44 of this invention illustrated in FIGURES 9-13.

In particular, the apparatus 44 comprises a first die means 45 adapted to encompass the coupling sleeve 23 at the annular groove 24 therein so as to be interconnected thereto in a manner hereinafter described.

Figure 9:
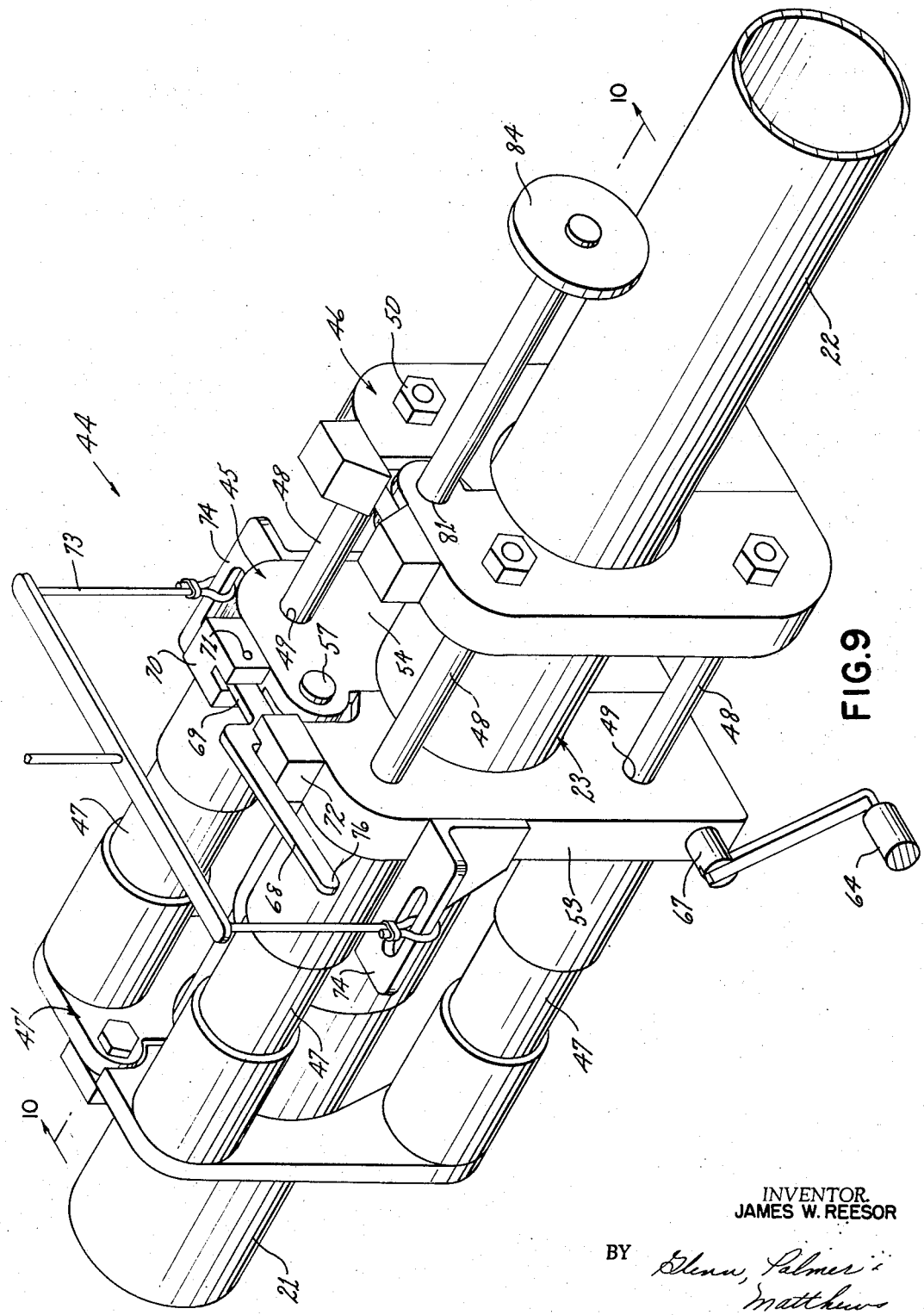
FIGURE 9 is a perspective view illustrating the improved apparatus of this invention for completing the coupling structure illustrated in FIGURE 6.
Figure 10:
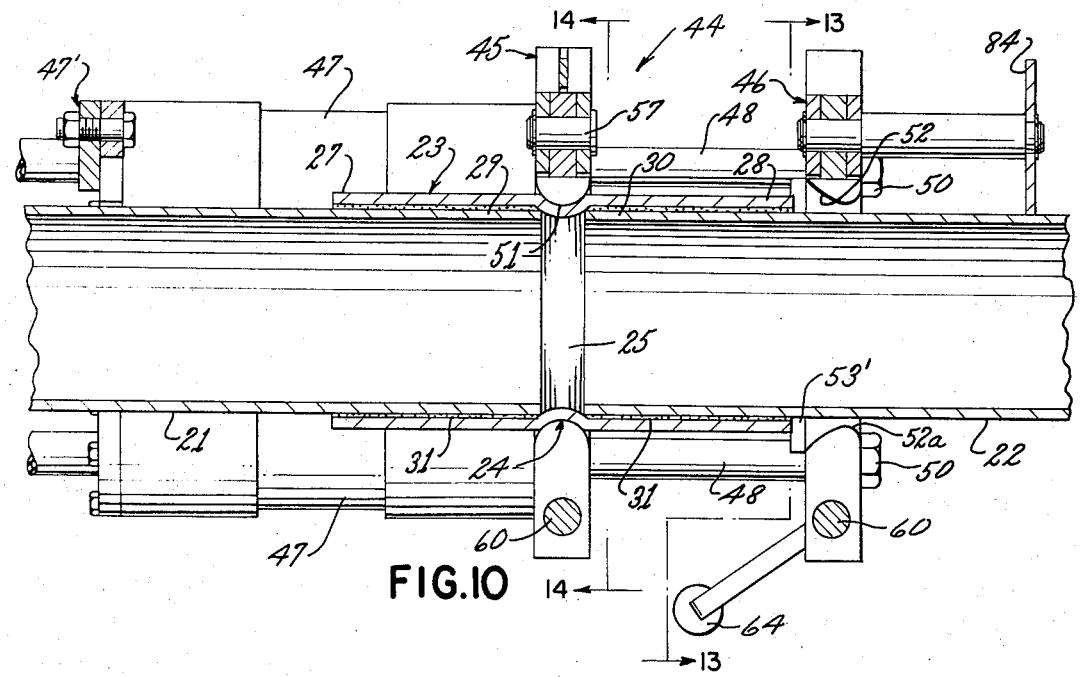
FIGURE 10 is a cross-sectional view taken on line 10—10 of FIGURE 9.

Another die means 46 is carried by the apparatus 44 and is adapted to encompass one of the conduits 21 or 22 at a point disposed outboard of the coupling sleeve 23 in the manner illustrated in FIGURES 9 and 10.

The die means 45 carries a plurality of cylinder defining members 47 interconnected at one end thereof to the die means 45 and to a plate means 47' at the other end thereof, each cylinder 47 having a suitable piston disposed therein and interconnected to a piston rod 48 extending through a suitable aperture 49 in the die means 45 and being interconnected to the die means 46 by nut means 50.

With the apparatus 44 disposed in the position illustrated in FIGURE 10, suitable hydraulic fluid or pressure is directed to one side of the pistons in the cylinder defining means 46 to tend to draw the die means 46 toward the die means 45, the die means 45 having a rounded internal peripheral surface 51 received in the annular groove 24 of the coupler 23 in the manner illustrated in FIGURE 10.

Figure 11:
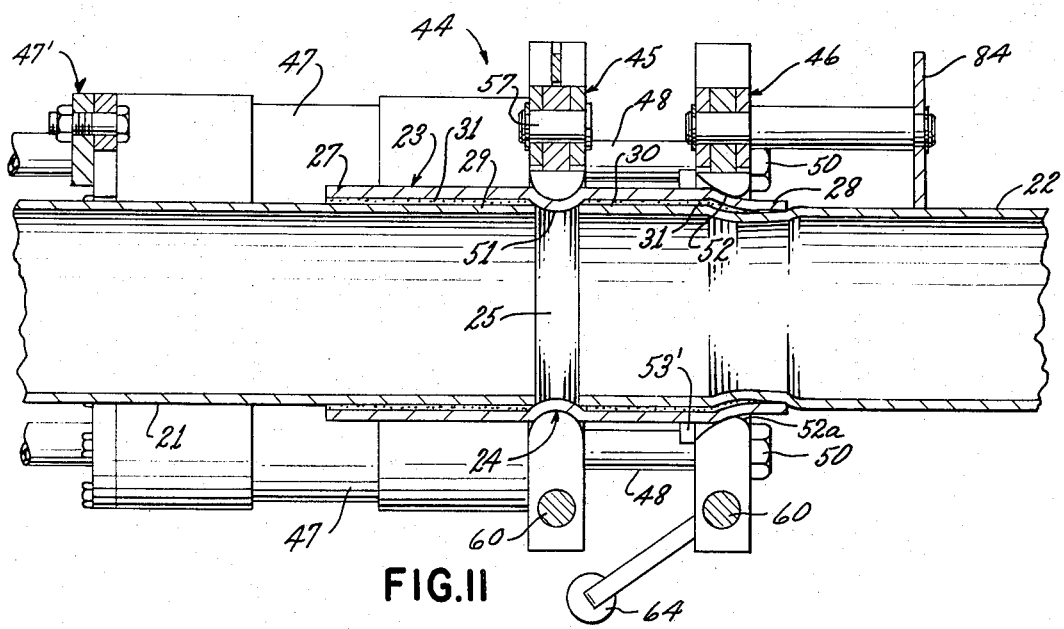
FIGURE 11 is a view similar to FIGURE 10 and illustrates the apparatus of this invention in one of the operating positions thereof.

As illustrated in FIGURE 10, the die means 46 has an arcuate internal peripheral surface 52 which is adapted to cam radially inwardly one of the ends 27 or 28 of the coupling sleeve 23 in the manner illustrated in FIGURE 11 as the die means 46 is drawn toward the die means 45.

Since the angle of attack of the camming surface 52 of the die means 46 of the apparatus 44 is substantially less than the angle of attack of the die surface 51 of the die means 45, the die means 46 will be drawn toward the die means 45 in the manner illustrated in FIGURE 11 until the same shrinks the coupling sleeve 23 onto the particular conduit 22 in the manner illustrated in FIGURE 11 at which time the die means 45 will then inwardly swedge the annular bead 25 of the coupling sleeve 23 against the end 30 of the conduit 22. Since the force resisting further movement of the die means 45 toward the die means 46 is not only provided by the end 30 of the conduit 22, but also by the angle of attack of the die surface 51 thereof, the die means 46 will be drawn toward the die means 45 until arcuate spacers 53', FIGURE 13, of the die means 46 abut the die means 45 in the manner illustrated in FIGURE 12 whereby it can be seen that the die means 46 inwardly shrinks the end 28 of the coupling sleeve 23 onto the end 30 of the conduit 22 to form one-half of the coupling construction illustrated in FIGURE 6.

Figure 12:
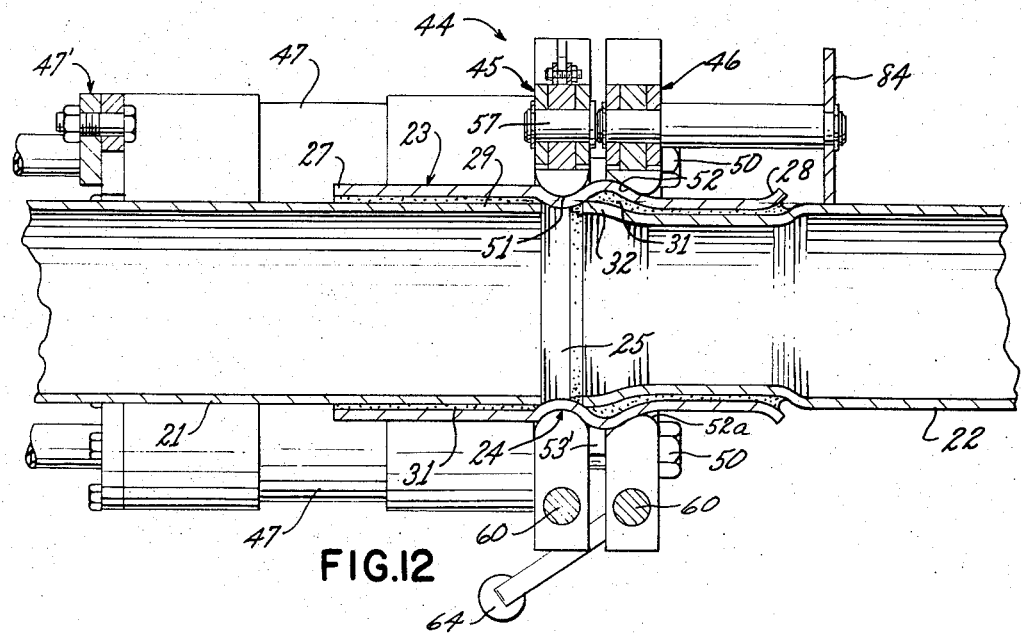
FIGURE 12 is a view similar to FIGURE 10 and illustrates the apparatus in still another operating position thereof.

However, after the die means 46 has been drawn toward the die means 45 in the manner illustrated in FIGURE 12, the extreme outer end of the end 28 of the coupler tends to flare outwardly as illustrated in FIGURE 12. This flare can be wiped downwardly by reversing the movement of the die means 46 away from the die means 45 whereby a camming surface 52a on the rear side of the die means 46 wipes down the outer flare of the coupling sleeve 23.

Therefore, by reversing the position of the apparatus 44 on the conduit system 20 so that the die means 46 will now shrink the end 27 of the coupling sleeve 23 onto the end 29 the conduit 21 in the manner previously described, it can be seen that the apparatus 44 can complete the joint structure illustrated in FIGURE 6.

As the die means 46 is shrinking the particular end of the coupling sleeve 23 to the respective end of the conduit 21 or 22, it can be seen that there is a tendency for the adhesive 31 to extrude to the center of the coupling sleeve 23. However, because of the scores provided in the internal peripheral surface 26 of the coupling sleeve 23 by the knurling operation, the adhesive is trapped in the scores and will remain throughout the length of the coupling sleeve 26 to provide the aforementioned binding and sealing operation with an optimum thickness of adhesive 31 between the coupling sleeve 23 and pipe 21 or 22.

Further, since a homogeneous adhesive film without air inclusions therein is required between the coupler 23 and the conduits 21 and 22 for best possible results, the wiping action on the adhesive which occurs when the sleeve 23 is shrunk from one end thereof to the center effectively pushes all of the air out of the adhesive to produce the homogeneous adhesive film between the coupler 23 and conduits 21 and 22.

The particular details of the apparatus 44 will now be described.

Figure 14:
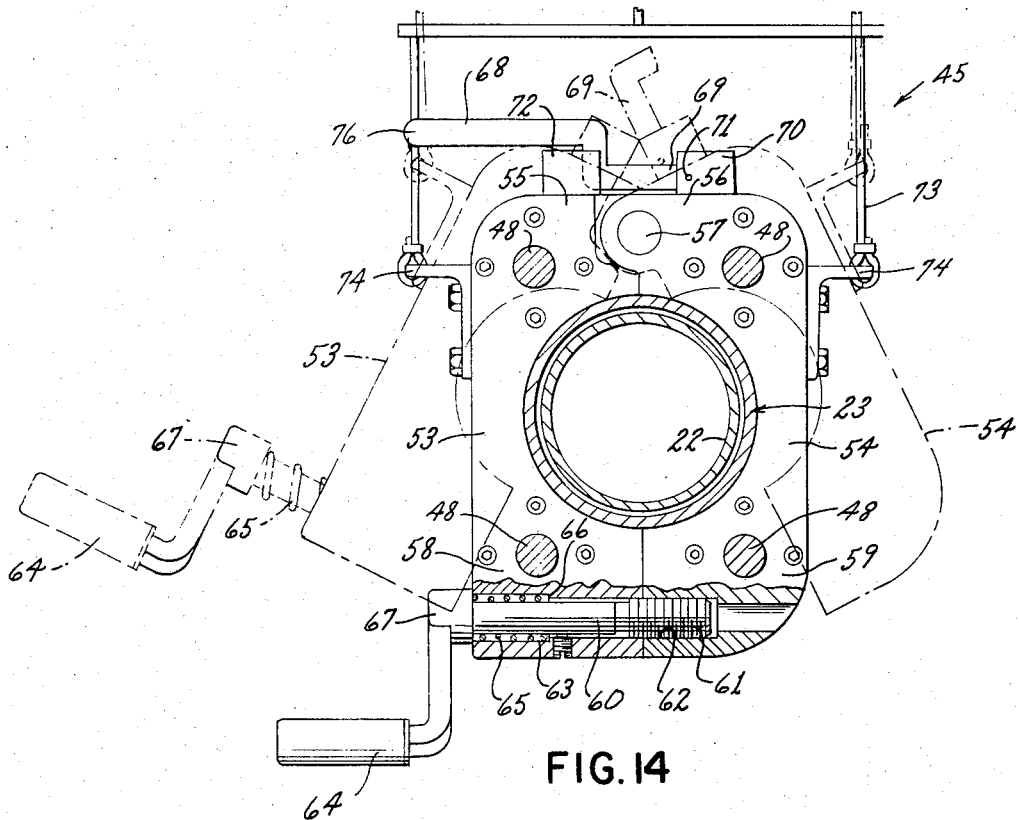
FIGURE 14 is a view similar to FIGURE 13 and is taken on line 14—14 of FIGURE 10.
Figure 15:
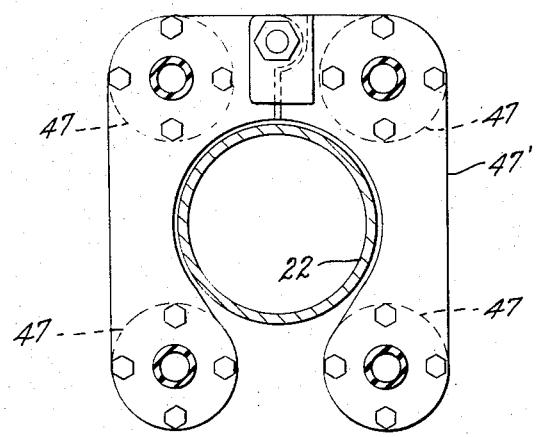
FIGURE 15 is an end view of the apparatus illustrated in FIGURE 10.

As illustrated in FIGURE 14, the die means 45 comprises two parts 53 and 54 respectively having adjacent ends 55 and 56 hinged together by a pivot pin means 57.

The other ends 58 and 59 of the parts 53 and 54 of the die means 45 are detachably secured together by a member 60 having a threaded end 61 received in a threaded bore 62 of the part 54 as illustrated in FIGURE 14, the member 60 passing through a stepped bore means 63 in the part 53 and having a crank handle 64 on the outer end thereof.

A compression spring 65 is disposed between a shoulder 66 of the part 53 and an enlarged portion 67 of the member 60 disposed outside of the bore means 63.

Thus, when the crank handle 64 is turned in the proper direction, the threaded part 61 of the member 60 is unthreaded from the bore 63 of the part 54 until the same separate whereby the spring means 65 moves the member 60 to the left to disconnect the threaded portion 61 from the threaded bore 62 of the part 54 so that the parts 53 and 54 can be opened from around the conduit system 20 in the manner illustrated in dotted lines in FIGURE 14 and be removed therefrom.

Since the apparatus 44 is normally suspended by cables 73 attached to brackets 74 secured to the movable parts 53 and 54 of the die means, it is necessary to provide a gravity lock for locking the parts 53 and 54 in their closed positions around the piping arrangement in the manner illustrated in FIGURES 9 and 14.

For example, it can be seen in FIGURES 9 and 14 that a lever handle 68 is provided and has one end 69 pivoted to a boss 70 on the part 54 by a pivot pin 71, the lever member 68 being receivable by gravity into a suitable slot 75 in a boss 72 on the part 53 when the parts 53 and 54 are disposed in the full line position illustrated in FIGURE 14 whereby the lever handle 68 holds the parts 53 and 54 in their closed position until the crank handle 64 is turned to further lock the parts 53 and 54 in their closed positions.

Thus, after the parts 53 and 54 have been subsequently unlocked by the handle 64, lifting upwardly on the handle portion 76 of the member 68, causes the parts 53 and 54 of the die means 45 to open upwardly about the pivot point 57 by the tension on the support cables 73 to permit the same to be readily released from the coupling sleeve 23 when desired.

Figure 13:
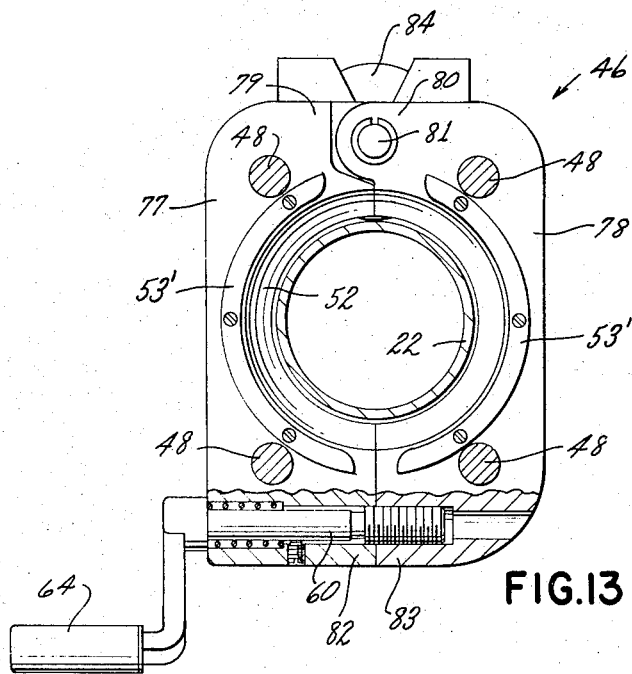
FIGURE 13 is a fragmentary cross-sectional view taken on line 13—13 of FIGURE 10.

As illustrated in FIGURE 13, the die means 46 is constructed of two parts 77 and 78 respectively having the ends 79 and 80 thereof hinged together by a pivot means 81 similar to the pivot means 57 for the die means 45. Also, the other ends 82 and 83 of the parts 77 and 78 of the die means 46 are detachably secured together by means 60 in a manner similar to the means 60 for the die means 45 previously described.

Thus, it can be seen that the parts 77 and 78 of the die means 46 are adapted to be opened and closed in the same manner as the parts 53 and 54 of the die means 45 previously described because the parts 77, 78 and 53, 54 are tied together by the piston rods 48.

Therefore, it can be seen that the apparatus 44 of this invention is relatively simple to construct and to operate to provide the improved coupling construction of this invention.

If desired, the pivot shaft 81 of the parts 77 and 78 of the die means 46 can carry a guide means 84 in the manner illustrated in FIGURE 9 to guide the movement of the die means 46 relative to the die means 45 and prevent the same from cocking relative thereto.

Therefore, it can be seen that not only does this invention provide an improved conduit system or the like, but this invention also provides an improved method and apparatus for making such a conduit system or the like.

While the form of the invention now preferred has been disclosed as required by the statutes, other forms may be used, all coming within the scope of the claims which follow.

What is claimed is:
1. A method for making a conduit system comprising the steps of
 (a) providing a pair of conduits respectively having adjacent ends;
 (b) providing a coupling sleeve having opposed ends;
 (c) providing a radially inwardly directed annular bead in said sleeve intermediate said opposed ends of said sleeve;
 (d) disposing adhesive means between said ends of said conduit and said coupling sleeve;
 (e) telescoping said ends of said conduits into said opposed ends of said coupling sleeve so that said annular bead spaces said ends of the conduits from each other and said adhesive means extends substantially over the entire overlapping area of said coupling sleeve and said conduct ends;
 (f) clamping said inwardly directed annular bead in said sleeve with a fixed die means while sequentially radially inwardly shrinking beyond their elastic limits the outer portions of said coupling sleeve and said ends of said conduits with a movable die means having a smaller diameter than said coupling sleeve drawn axially with respect to said conduit and said coupling sleeve toward said fixed die means to place said adhesive means and said ends of said conduits under compression, to secure said conduits and said sleeve together and to flare radially outwardly the ends of said sleeve and the ends of said conduits;
 (g) and thereafter reversing the axial direction of said movable die means to wipe radially downwardly the flared ends of said sleeve.

2. A method for making a conduit system as defined in claim 1, including providing said conduits with a higher yield strength than the yield strength of said sleeve whereby said conduits will spring back more than the sleeve after being acted upon by said fixed and said movable die means.

3. A method as set forth in claim 1 wherein said step of radially inwardly shrinking said outer portions of said coupling sleeve causes said flared radial outer end portions of said conduits to mechanically interlock with said coupling sleeve when an attempt is made to pull said conduits from said coupling sleeve.

4. A method as set forth in claim 4 and including the step of internally scoring the ends of said coupling sleeve to provide means to trap said adhesive means between said sleeve and said conduits when said outer portions of said coupling sleeve are radially inwardly shrunk.

References Cited

UNITED STATES PATENTS

| | | | |
|---|---|---|---|
| 283,973 | 8/1883 | Converse | 285—292 |
| 2,064,129 | 12/1936 | Temple | 29—517 |
| 2,192,914 | 3/1940 | Ice | 285—382.2 X |
| 2,367,206 | 1/1945 | Davis | 285—382.2 X |
| 2,406,235 | 8/1946 | McCoy | 285—238 X |
| 2,573,366 | 10/1951 | Scholl | 285—292 |
| 2,751,236 | 6/1956 | Wyatt | 285—292 |
| 3,047,043 | 7/1962 | Albrecht | 29—237 |
| 3,068,563 | 12/1962 | Reverman | 29—458 |
| 3,124,874 | 3/1964 | Woolley | 29—458 |
| 3,137,063 | 6/1964 | Pennachi et al. | 29—237 |

EDWARD C. ALLEN, *Primary Examiner.*

CARL W. TOMLIN, *Examiner.*

D. W. AROLA, T. A. LISLE, *Assistant Examiners.*